United States Patent
Shim et al.

(10) Patent No.: US 10,446,839 B2
(45) Date of Patent: Oct. 15, 2019

(54) POSITIVE ACTIVE MATERIAL FOR RECHARGEABLE LITHIUM BATTERY, METHOD OF MANUFACTURING THE SAME, AND RECHARGEABLE LITHIUM BATTERY INCLUDING THE SAME

(71) Applicant: SAMSUNG SDI CO., LTD., Yongin-si, Gyeonggi-do (KR)

(72) Inventors: Jae-Hyun Shim, Yongin-si (KR); Ki-Soo Lee, Yongin-si (KR); Se-Hee Lee, Yongin-si (KR); Hyeon-Ah Ju, Yongin-si (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 96 days.

(21) Appl. No.: 15/412,225

(22) Filed: Jan. 23, 2017

(65) Prior Publication Data

US 2017/0263925 A1    Sep. 14, 2017

(30) Foreign Application Priority Data

Mar. 11, 2016    (KR) .................. 10-2016-0029755

(51) Int. Cl.
| | |
|---|---|
| *H01M 4/36* | (2006.01) |
| *B01J 13/04* | (2006.01) |
| *H01M 4/485* | (2010.01) |
| *H01M 4/525* | (2010.01) |
| *H01M 10/0525* | (2010.01) |

(Continued)

(52) U.S. Cl.
CPC ............ *H01M 4/366* (2013.01); *B01J 13/04* (2013.01); *C01G 23/006* (2013.01); *C01G 51/42* (2013.01);

(Continued)

(58) Field of Classification Search
None
See application file for complete search history.

(56) References Cited

U.S. PATENT DOCUMENTS

| | | |
|---|---|---|
| 2011/0269018 A1 | 11/2011 | Kono et al. |
| 2015/0380722 A1 | 12/2015 | Blangero et al. |
| 2016/0164086 A1 | 6/2016 | Yamamoto et al. |

FOREIGN PATENT DOCUMENTS

| | | |
|---|---|---|
| EP | 2 521 211 A1 | 11/2012 |
| KR | 10-2006-0085085 A | 7/2006 |

(Continued)

OTHER PUBLICATIONS

Jae-Hyun Shim, et al., "Synergistic effects of coating and doping for lithium ion battery cathode materials: synthesis and characterization of lithium titanate-coated LiCo O2 with Mg doping", Electrochimica Acta, vol. 186, Nov. 11, 2015, pp. 201-208.

(Continued)

*Primary Examiner* — Carmen V Lyles-Irving
(74) *Attorney, Agent, or Firm* — Lee & Morse, P.C.

(57) ABSTRACT

A positive active material for a rechargeable lithium battery includes a first oxide particle having a layered structure and a second oxide layer located in a surface of the first oxide particle and including a second oxide represented by the following Chemical Formula 1: $M_aL_bO_c$, wherein in Chemical Formula 1, $0<a\leq3$, $1\leq b\leq2$, $3.8\leq c\leq4.2$, M is at least one element selected from the group of Mg, Al, Ga, and combinations thereof, and L is at least one element selected from of group Ti, Zr, and combinations thereof.

2 Claims, 21 Drawing Sheets

(51) Int. Cl.
*C01G 23/00* (2006.01)
*C01G 51/00* (2006.01)
*H01M 4/131* (2010.01)
*H01M 4/1391* (2010.01)
*H01M 4/62* (2006.01)
*H01M 4/02* (2006.01)

(52) U.S. Cl.
CPC ......... *H01M 4/131* (2013.01); *H01M 4/1391* (2013.01); *H01M 4/485* (2013.01); *H01M 4/525* (2013.01); *H01M 4/62* (2013.01); *H01M 10/0525* (2013.01); *C01P 2002/20* (2013.01); *C01P 2002/32* (2013.01); *C01P 2002/50* (2013.01); *C01P 2004/03* (2013.01); *C01P 2004/04* (2013.01); *H01M 2004/028* (2013.01); *H01M 2220/30* (2013.01)

(56) References Cited

FOREIGN PATENT DOCUMENTS

KR 10-2012-0114811 A 10/2012
KR 10-2013-0097733 A 9/2013

OTHER PUBLICATIONS

Jae-Hyun Shim, et al., "Synthesis and characterization of Mg2TiO4-coated LiCoO2 as a cathode material for lithium ion batteries", Electrochimica Acta., vol. 243, May 15, 2017, pp. 162-169.
George Ting-Kuo Fey, et al., "MgAl2O3 spinel-coated LiCoO2 as long-cycling cathode materials", Journal of Power Sources, vol. 146, No. 1-2, Aug. 26, 2005, pp. 245-249.
Extended European Search Report dated Jun. 26, 2017 of the corresponding European Patent Application No. 17159455.9.

◌ : 8a   ⊙ : 16d   ◯ : 16d (a) corresponds to Comparative Example 3
(b) corresponds to Exemplary embodiment 6
(c) corresponds to Exemplary embodiment 7
(d) corresponds to Exemplary embodiment 8
(e) corresponds to Comparative Example 4

(a) corresponds to Comparative Example 3
(b) corresponds to Exemplary embodiment 6
(c) corresponds to Exemplary embodiment 7
(d) corresponds to Exemplary embodiment 8
(e) corresponds to Comparative Example 4

(a) corresponds to Comparative Example 3
(b) corresponds to Exemplary embodiment 6
(c) corresponds to Exemplary embodiment 7
(d) corresponds to Exemplary embodiment 8

(a) corresponds to Comparative Example 3
(b) corresponds to Exemplary embodiment 6
(c) corresponds to Exemplary embodiment 7
(d) corresponds to Exemplary embodiment 8

POSITIVE ACTIVE MATERIAL FOR RECHARGEABLE LITHIUM BATTERY, METHOD OF MANUFACTURING THE SAME, AND RECHARGEABLE LITHIUM BATTERY INCLUDING THE SAME

CROSS-REFERENCE TO RELATED APPLICATION

Korean Patent Application No. 10-2016-0029755, filed on Mar. 11, 2016, in the Korean Intellectual Property Office, and entitled: "Positive Active Material for Rechargeable Lithium Battery, Method of Manufacturing the Same, and Rechargeable Lithium Battery Including the Same," is incorporated by reference herein in its entirety.

BACKGROUND

1. Field

Embodiments relate generally to a positive active material for a rechargeable lithium battery, a manufacturing method thereof, and a rechargeable lithium battery including the same.

2. Description of the Related Art

A rechargeable lithium battery may be provided by injecting an electrolyte solution into a battery cell including a positive electrode having a positive active material capable of performing intercalation and deintercalation of lithium ions and a negative electrode having a negative active material capable of performing the intercalation and the deintercalation of lithium ions.

Due to recent trends toward more compact and lighter portable electronic equipment, it has become desirable to develop a high performance and large capacity battery to power this portable electronic equipment. In particular, there has been extensive research into rechargeable lithium batteries.

In order to meet the recent market demand, research on improving a lifespan characteristic and a rate characteristic of the rechargeable lithium battery has been conducted.

SUMMARY

Embodiments are directed to a positive active material for a rechargeable lithium battery including a first oxide particle having a layered structure and a second oxide layer located in a surface of the first oxide particle and including a second oxide represented by the following Chemical Formula 1: $M_aL_bO_c$, wherein in Chemical Formula 1, $0 < a \leq 3$, $1 \leq b \leq 2$, $3.8 \leq c \leq 4.2$, M is at least one element selected from the group of Mg, Al, Ga, and combinations thereof, and L is at least one element selected from of group Ti, Zr, and combinations thereof.

The first oxide particle may include a first oxide that includes M. A concentration of M in the first oxide may be less than a concentration of M in the second oxide.

A concentration of the M in the second oxide may decrease according to a continuous concentration gradient from a surface of the positive active material toward an inside of the positive active material.

The second oxide may have a spinel structure.

The second oxide may include a phase of $Mg_2TiO_4$.

The first oxide may be at least one selected from a lithium nickel-based oxide, lithium cobalt-based oxide, lithium iron phosphate-based oxide, lithium manganese-based oxide, lithium titanium-based oxide, lithium nickel manganese-based oxide, lithium nickel cobalt manganese-based oxide, lithium nickel cobalt aluminum-based oxide, and combinations thereof.

Embodiments are also directed to a method of manufacturing a positive active material for a rechargeable lithium battery including providing a first oxide particle doped with at least one element selected from the group of Mg, Al, Ga, and combinations thereof, providing a coating solution including at least one element selected from the group of Ti, Zr, and combinations thereof, mixing the doped first oxide particle and the coating solution to manufacture a mixture, drying the mixture to obtain a dried product, and heat-treating the dried product.

The doped first oxide particle may be obtained by doping the first oxide particle with 0.001 mol % to 0.02 mol % of the at least one element with respect to an entire 100 mol % of the first oxide particle.

Drying the mixture of the doped first oxide and the coating solution may be performed at a temperature of 60° C. to 100° C. for 15 hours to 48 hours.

The heat treatment may be performed at a temperature of 750° C. to 1100° C. for 3 hours to 20 hours.

Embodiments are also directed to a rechargeable lithium battery including the positive electrode including the positive active material as described above, a negative electrode including a negative active material, and an electrolyte.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
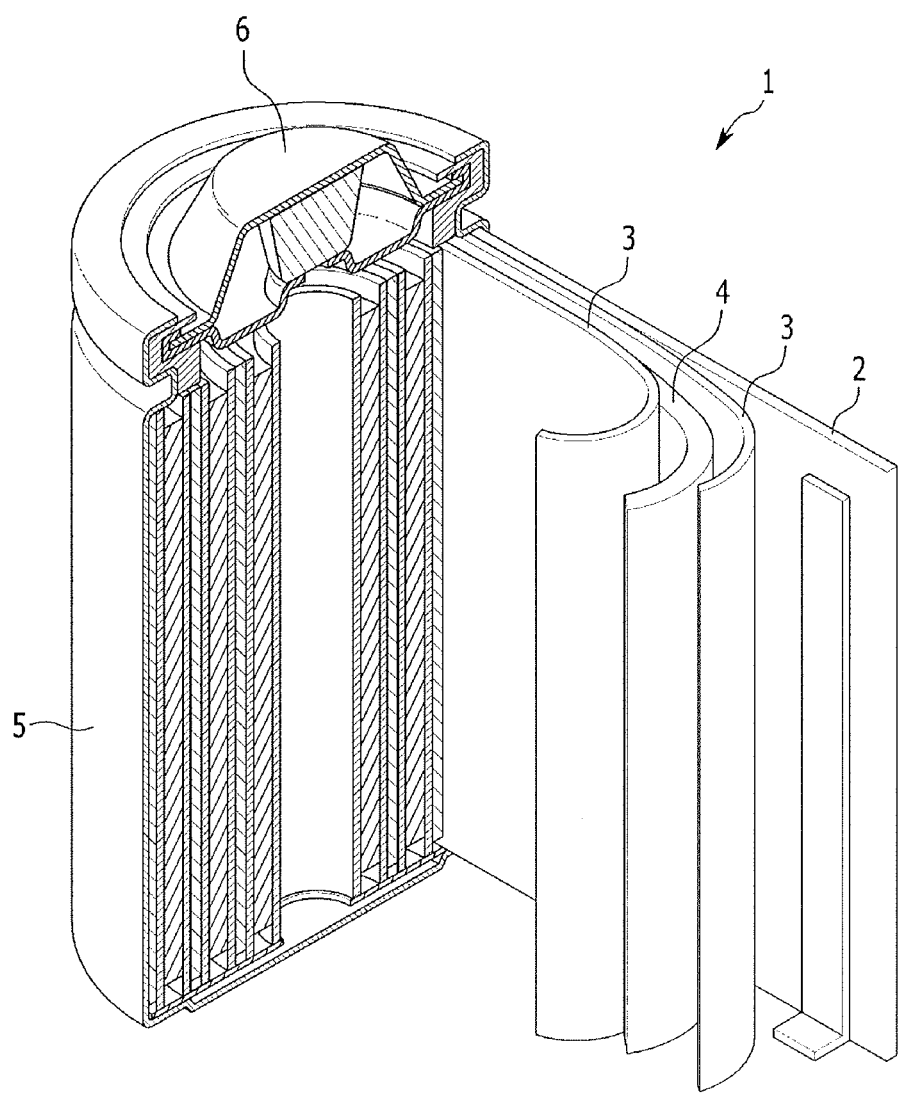
FIG. 1 illustrates a schematic view showing a structure of a rechargeable lithium battery according to an exemplary embodiment.
Figure 2A:
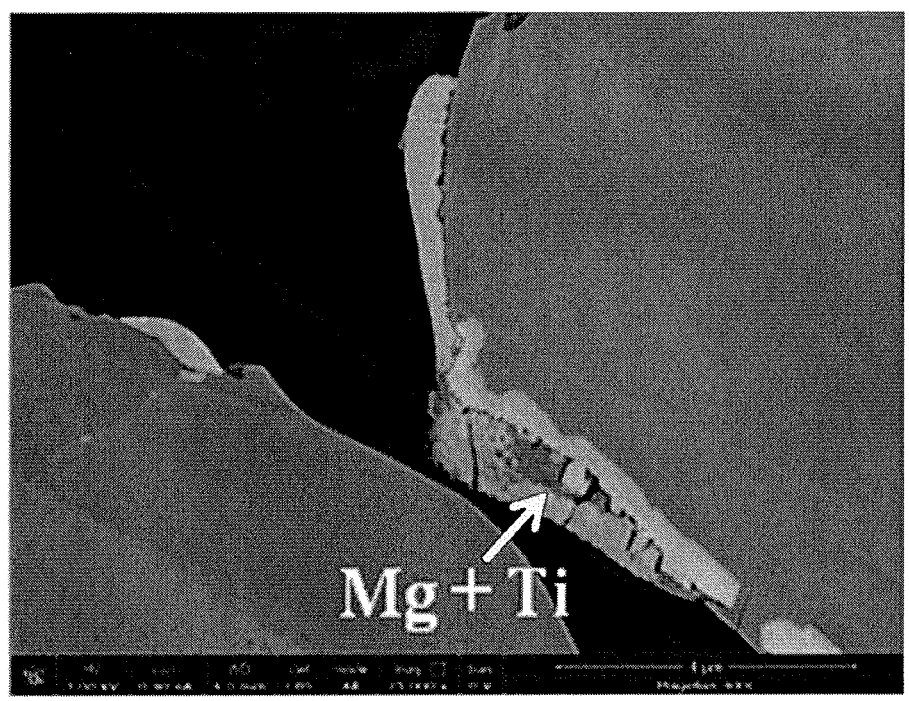
FIG. 2A to FIG. 2F illustrate SEM images showing a cross-section of a positive active material manufactured by Exemplary Embodiment 1 to Exemplary Embodiment 5 and Comparative Example 1, respectively.
Figure 2B:
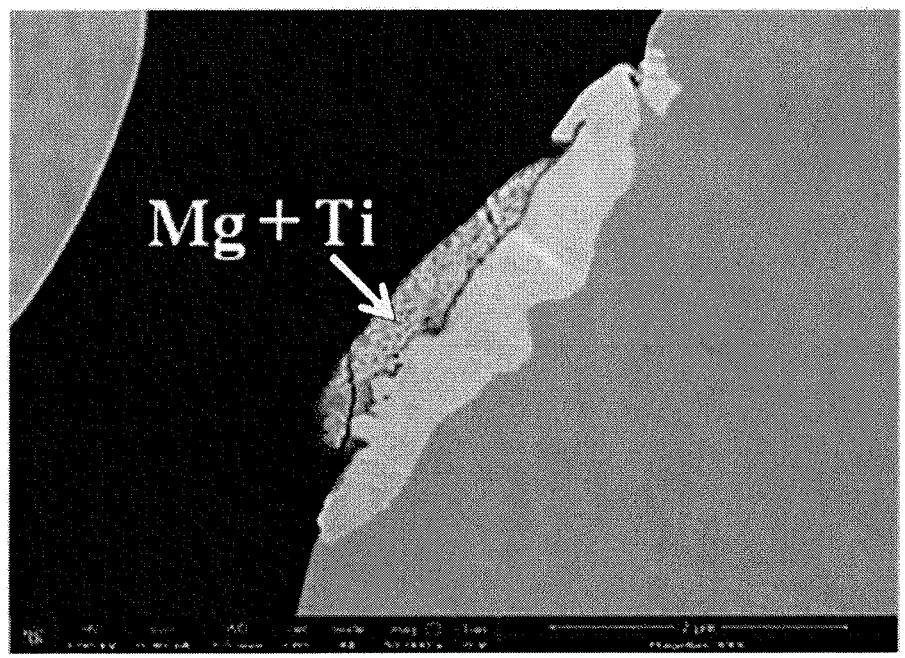
Figure 2C:
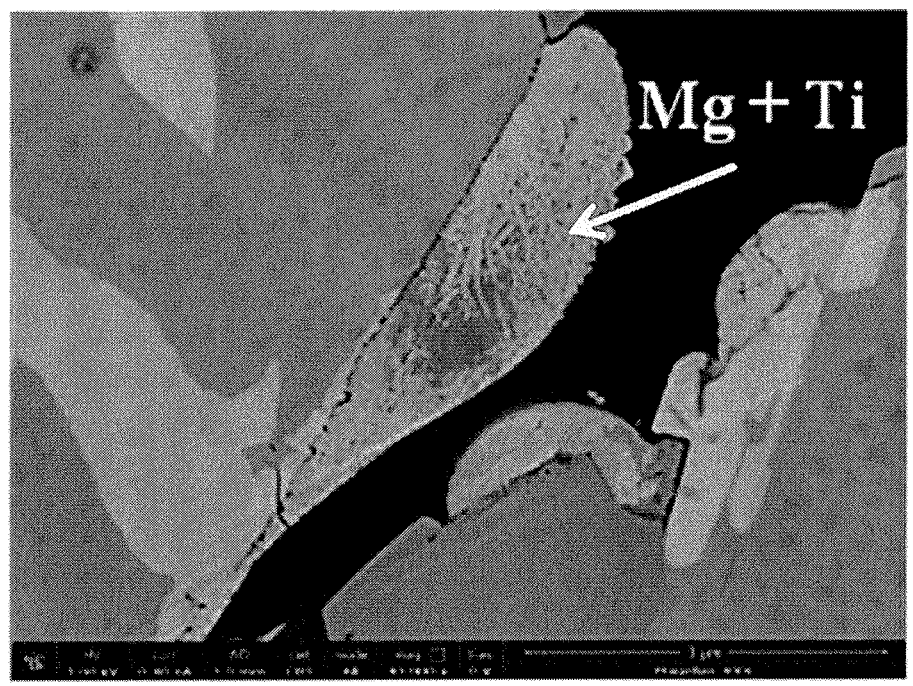
Figure 2D:
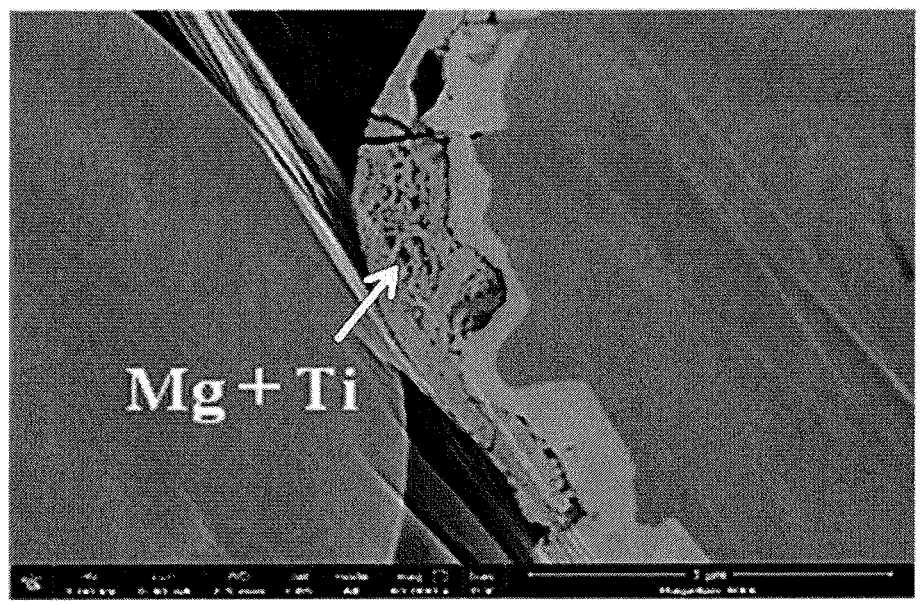
Figure 2E:
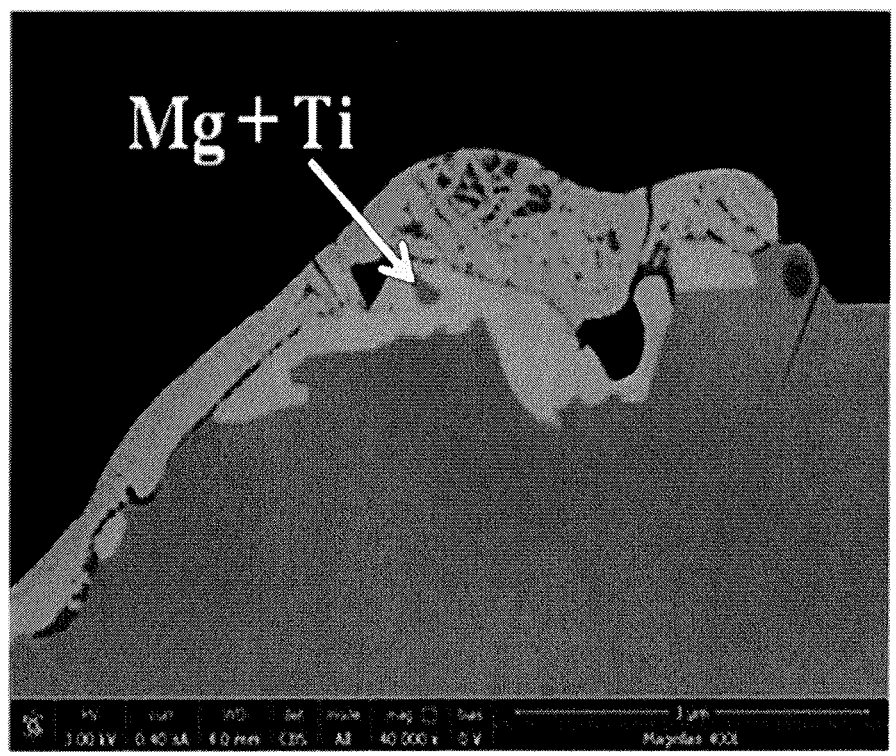
Figure 2F:
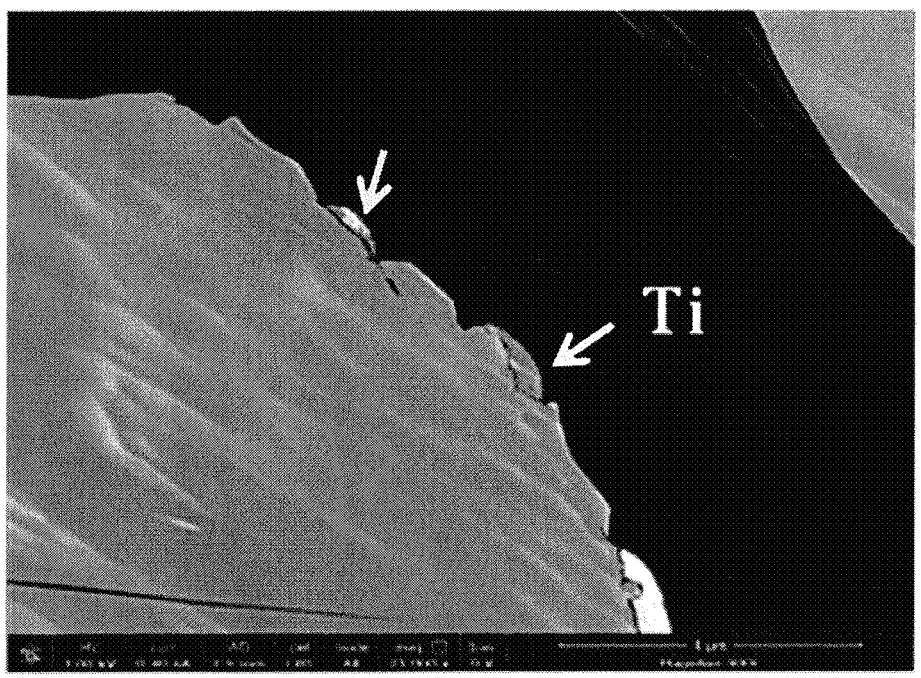

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

The positive active material for the rechargeable lithium battery according to an exemplary embodiment may include a first oxide particle having a layered structure and a second oxide layer including a second oxide represented by Chemical Formula 1, the second oxide being positioned at a surface of the first oxide particle.

$$M_aL_bO_c \qquad \text{[Chemical Formula 1]}$$

In Chemical Formula 1,
0<a≤3,
1≤b≤2,
3.8≤c≤4.2,

M is at least one element selected from the group of Mg, Al, Ga, and combinations thereof, and L is at least one element selected from the group of Ti, Zr, and combinations thereof.

The first oxide particle having the layered structure may be, for example, one selected from a lithium nickel-based oxide, a lithium cobalt-based oxide, a lithium iron phosphate-based oxide, a lithium manganese-based oxide, a lithium titanium-based oxide, a lithium nickel manganese-based oxide, a lithium nickel cobalt manganese-based oxide, a lithium nickel cobalt aluminum-based oxide, or combinations thereof.

In Chemical Formula 1, the value a represents a doping amount of M. In Chemical Formula 1, a may be 0<a≤3, or, for example, 0.5≤ a≤2.5. When the value a is in the above range, the capacity and rate characteristics may be excellent, and the active material may be structurally stable such that the lifespan characteristic may be improved.

Also, in Chemical Formula 1, the value b represents a coating amount of L. In Chemical Formula 1, b may be 1≤b≤2. When the value b is in the above range, the dispersion of the dopant may be easy such that the volume may be increased and a spinel structure of $M_2LO_4$ may be stably formed.

The second oxide included in the second oxide layer may be positioned at the surface of the first oxide particle of the layered structure and may have a form of a regular and/or irregular island shape.

M included in the second oxide may be a single metal oxide doped to the first oxide particle. For example, the single metal oxide doped to the first oxide particle may have diffused into the surface in the heat treatment process and may have reacted with L included in a coating solution coated on the surface of the first oxide particle, thereby forming the second oxide layer including the second oxide.

As described above, when the positive active material is manufactured through the method of coating the coating solution including L onto the first oxide particle coated with M and performing the heat treatment, the ion conductivity and the electrical conductivity may be excellent, and the rate characteristic and the lifespan characteristic may be remarkably improved when charging or discharging the rechargeable battery, compared with the case where the first oxide particle is coated without the doping and the heat treatment is performed, or where the first oxide particle is doped without the coating and the heat treatment is performed to manufacture the positive active material.

The second oxide may have the spinel structure. For example, the spinel structure of the second oxide may be a phase of $Mg_2TiO_4$.

In general, during charging and/or discharging of a rechargeable battery, an oxide having a spinel structure may have a more stable phase structure transition compared to an oxide having a layered structure, thereby having a merit of stability. Accordingly, as shown herein, when positioning the second oxide layer including the second oxide of the spinel structure at the surface of the first oxide particle of the layered structure, the lifespan characteristic may be improved during charging and discharging at a high rate.

In the second oxide, a concentration of M decreases from a surface of the positive active material toward the inside of the positive active material according to a continuous concentration gradient. When the continuous gradient is formed, the dopant remains in the surface of the active material such that the stability of the surface structure is maintained, thereby improving the lifespan characteristic.

Without being bound to any particular theory, it is believed that, in the case of the positive active material according to the present disclosure, the formation of the concentration gradient is the reason that the M included in the first oxide particle is reacted with the L included in the coating solution in the heat treatment process such that the second oxide layer includes the second oxide. For example, in order to suppress a side reaction with an electrolyte solution in the first oxide particle of the layered structure, if the doping amount of the M as the metal oxide of the single element were simply increased, there is a likelihood that the capacity of the positive active material could decrease. However, according to embodiments, when diffusing the M through the heat treatment process in the surface after coating the surface of the first oxide particle doped with the M with the coating solution including the L, for example, when the M is formed such that it has the continuously decreasing concentration gradient from the surface of the positive active material toward the inside, the capacity of the positive active material may increase instead of decrease. Accordingly, a positive active material with an improved rate characteristic and the lifespan characteristic may be obtained.

The positive active material for the rechargeable lithium battery according to an exemplary embodiment may be manufactured by the following method.

The manufacturing method of the positive active material for the rechargeable lithium battery according to the present exemplary embodiment may include manufacturing the first oxide particle doped with at least one element selected from the group of Mg, Al, Ga, and combinations thereof, manufacturing the coating solution including at least one element selected from the group of Ti, Zr, and combinations thereof, mixing the doped first oxide particle and the coating solution to manufacture the mixture, drying the mixture to obtain a dried product, and heat-treating the dried product.

To manufacture the first oxide particle doped with at least one element selected from the group of Mg, Al, Ga, and combinations, the doping may be performed with a doping content of 0.001 mol % to 0.02 mol % for an entire 100 mol % of the first oxide particle. In the first oxide particle doped above, a ratio of lithium to the total content of other metal elements of the first oxide (for example, nickel, cobalt, iron phosphate, manganese, titanium, nickel-manganese, nickelcobalt-manganese or nickel-cobalt-aluminum) may be in a range of 1:0.98 to 1:1.01 or 1:0.99 to 1:1. When the ratio of lithium and the metal element satisfies the above-numerical range in the doped first oxide particle, there may be an advantage that residual lithium in the doped first oxide particle is not present. If residual lithium were to remain in the first oxide particle, the residual lithium could react with the surface coating layer such that a structure of $Li_2TiO$ or $Li_4Ti_5O_{12}$ could be formed. Accordingly, that the ratio of lithium and the metal element may be selected such that the content of the residual lithium be low.

In manufacturing the coating solution including at least one element selected from the group including Ti, Zr, and combinations thereof, the amount of the compound including at least one element selected from the group of Ti, Zr, and combinations thereof may be 1.5 wt % to 3.5 wt % in the entire coating solution. When the amount of the compound including at least one element selected from the group including Ti, Zr, and combinations thereof satisfies the above numerical range, the second oxide layer including the phase of $Mg_2TiO_4$ having the spinel structure may be appropriately formed in the surface of the first oxide particle through the following-described heat treatment process. If the content of the elements included in the coating solution is out the numerical range, impurities may be included. In some implementations, the coating solution may be manufactured by a process of mixing and stirring the elements and the solvent. In this case, as the solvent, ethanol, methanol, or combinations thereof may be used, for example.

In some implementations, the sequence of the doping and the coating of the first oxide particle and the solution manufacturing may be varied.

The doped first oxide particle and the coating solution may be mixed to manufacture the mixture.

The ratio of the doped first oxide particle and the coating solution may be 1:0.0092 to 1:0.073. When the mixture ratio of the doped first oxide particle and the coating solution satisfies the above range, an improvement effect of the capacity characteristic may be obtained. If the mixture ratio of the doped first oxide particle and the coating solution is out the above range, the volume of the positive active material per gram may be reduced.

The mixture may be dried. The drying process may be performed at a temperature of 60° C. to 100° C. for 15 hours to 48 hours, thereby obtaining a dried product.

The dried product may be heat-treated at a temperature of 750° C. to 1100° C. for 3 hours to 20 hours. A sintering process may be performed through the heat treatment for 3 hours to 20 hours at an increased temperature after increasing the temperature to 700° C. to 950° C. at a rate of 5° C./min to 10° C./min.

When the positive active material is manufactured through the above-described method, the dopant included in the doped first oxide particle may react with L included in the coating solution on the surface of the first oxide particle to form a second oxide layer on the surface of the first oxide particle. The dopant included in the second oxide layer may have a concentration gradient that decreases continuously from the surface of the positive active material toward the inside. The second oxide layer may have a spinel structure having a phase of $Mg_2TiO_4$. As described above, when the second oxide layer as a conductive material is positioned in the surface of the first oxide particle of the layered structure, the electrical conductivity and the ion conductivity of the positive active material surface may be improved and the ratio characteristic and resultantly the lifespan characteristic of the positive active material may be remarkably improved.

The rechargeable lithium battery according to an exemplary embodiment includes the positive electrode including the positive active material and the negative electrode including the negative active material, and the electrolyte.

The positive electrode may include a current collector and the positive active material layer formed on the current collector.

As the positive active material, the positive active material according to the exemplary embodiments, for example, the positive active material manufactured according to the exemplary embodiments may be used. In the positive active material layer, the amount of the positive active material may be 90 wt % to 98 wt % with respect to the entire amount of the positive active material layer. The positive active material layer may also include a binder and a conductive material. The amount of the binder and the conductive material may each be 1 wt % to 5 wt % with respect to the entire weight of the positive active material layer. The binder may bind the positive active material particles to each other, and also may bind the positive active material to the current collector. Examples of the binder include at least one selected from polyvinyl alcohol, carboxymethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, or the like. The conductive material may provide conductivity to the positive electrode. A suitable electrically conductive material that does not cause chemical change may be used as a conductive agent. Examples of the conductive material may include natural graphite, artificial graphite, carbon black, acetylene black, ketjen black, a carbon fiber, a metal powder, or a metal fiber of copper, nickel, aluminum, silver, and the like; or a conductive polymer such as a polyphenylene derivative or a conductive material including mixtures thereof.

As the current collector, Al may be used, as an example.

The negative electrode may include the current collector and the negative active material layer formed on the current collector. The negative active material layer may include the negative active material.

The negative active material may include a material that can perform reversible intercalation and deintercalation of lithium ions, a lithium metal, an alloy of the lithium metal, a material doping or dedoping lithium, or a transition metal oxide. As a carbon-based material of the material that can perform reversible intercalation and deintercalation of lithium ions, a carbon-based negative active material that is generally used in a lithium ion secondary battery may be used. As representative examples, crystalline carbon, amorphous carbon, or a combination thereof may be used. An example of crystalline carbon may be graphite such as amorphous, plate-shaped, flake, circular, or fiber-like natural or artificial graphite. An example of amorphous carbon may be a soft carbon (a low temperature calcined carbon), a hard carbon, a mesophase pitch-based carbide, calcined coke, or a combination thereof. The alloy of the lithium metal may be a metal alloy of lithium and one selected from a group including Na, K, Rb, Cs, Fr, Be, Mg, Ca, Sr, Si. Sb, Pb, In, Zn, Ba, Ra, Ge, Al, and Sn. As the material doping and dedoping the lithium. Si. $SiOx$ (0<x<2), a Si-Q alloy (Q is an alkali metal, an alkali earth metal, a group 13 element, a group 14 element, a transition metal, a rare earth element, or a combination thereof, and is not Si), a Si—C composite, or a Si-based compound of a combination thereof; Sn, $SnO_2$, Sn—R (R is an alkali metal, an alkali earth metal, a group 13 element, a group 14 element, a transition metal, a rare earth element, or a combination thereof, and is not Sn), or a Sn-based compound of a combination thereof; or a combination thereof, may be used, and at least one of these and $SiO_2$ may be mixed. As the element Q and R, Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof may be used. As the transition metal oxide, a vanadium oxide, a lithium vanadium oxide, or a titanium oxide may be used. In the negative active material layer, the content of the negative active material may be 95 wt % to 99 wt % of the entire weight of the negative active material layer. The negative active material layer also includes a binder, and may further selectively include a conductive material. In the negative active material layer, the amount of the binder may be 1 wt % to 5 wt % of the entire weight of the negative active material layer. When further including the conductive material, the negative active material may be 90 wt % to 98 wt %, the binder may be 1 wt % to 5 wt %, and the conductive material may be 1 wt % to 5 wt %. The binder may bind negative electrode active material particles to each other, and bind a negative electrode active material to a current collector. The binder may be a non-aqueous binder, an aqueous binder, or combinations thereof. The non-aqueous binder may be polyvinyl chloride, carboxylated polyvinyl chloride, polyvinyl fluoride, a polymer including ethylene oxide, polyvinylpyrrolidone, polyurethane, polytetrafluoroethylene, polyvinylidene fluoride, polyethylene, polypropylene, polyamide-imide, polyimide, or a combination thereof. As the aqueous binder, styrene-butadiene rubber, acrylic federated styrene-butadiene rubber, polyvinyl alcohol, sodium polyacrylate, a copolymer of propylene and olefin of 2 to 8 carbon atoms, a copolymer of (meth)acrylic acid and (meth)acrylic acid alkyl esters, or combinations thereof may be used. When the negative electrode binder uses the aqueous binder, a cellulose-based compound providing viscosity may be further included as a thickening agent. The cellulous-based compound may be at least one mixture of carboxymethyl cellulose, hydroxypropyl methyl cellulose, methyl cellulose, or alkali metal salts thereof. The alkali metal may be Na, K, or Li. An amount of the thickening agent may be 0.1 wt % to 3 wt % with respect to 100 wt % of the binder. The conductive material may provide conductivity to the electrodes. The conductive material may be a suitable material that does not cause a chemical change and may bean electrically conductive material generally used in batteries. As an example of the conductor, a conductive material containing a carbon-based material, such as natural graphite, artificial graphite, carbon black, acetylene black, ketjen black, or carbon fiber; a metal-based material, such as a metal powder or a metal fiber of copper, nickel, aluminum, silver, or the like, a conductive polymer such as a polyphenylene derivative, or a mixture thereof, may be used.

The current collector may be at least one selected from copper foil, a nickel foil, a stainless steel foil, a titanium foil, a nickel foam, a copper foam, a polymer substrate coated with a conductive metal, or a combination thereof.

For manufacturing the negative electrode and the positive electrode, the active material, the binder, and the conductive material may be mixed in a solvent to manufacture an active material composition, and the composition may be coated onto the respective current collector such that the positive electrode and the negative electrode are respectively manufactured. When using the non-aqueous binder, for the negative electrode, an organic solvent such as N-methylpyrrolidone may be used as the solvent. When using the aqueous binder, water may be used as the solvent.

The electrolyte may include a non-aqueous organic solvent and a lithium salt.

The organic solvent may serve as a medium through which ions involved in an electrochemical reaction of a battery can move. As the non-aqueous organic solvent, a carbonate-based solvent, an ester-based solvent, an ether-based solvent, a ketone-based solvent, an alcohol-based solvent, or an aprotic solvent may be used. Examples of the carbonate based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), or the like. Examples of the ester-based solvent may include methyl acetate, ethyl acetate, n-propyl acetate, dimethyl acetate, methyl propionate, ethyl propionate, γ-butyrolactone, decanolide, valerolactone, mevalonolactone, caprolactone, or the like. The ether-based solvent may include dibutyl ether, tetraglyme, diglyme, dimethoxyethane, 2-methyltetrahydrofuran, tetrahydrofuran, or the like. The ketone-based solvent may include cyclohexanone or the like. In addition, the alcohol-based solvent may include ethyl alcohol, isopropyl alcohol, or the like. The aprotic solvent may include nitriles such as R—CN (R is a C2 to C20 linear, branched, or cyclic hydrocarbon group including a double bond, an aromatic ring, or an ether bond), amides such as dimethyl formamide or the like, dioxolanes such as 1,3-dioxolane or the like, or sulfolanes or the like. The non-aqueous organic solvent may be used alone or in combination of one or more solvents. The mixing ratio of the organic solvents used by mixing the one or more solvents may be controlled in accordance with the desired performance of a battery. The carbonate-based solvent may include a mixture of a cyclic carbonate and a chain carbonate. The cyclic carbonate and the chain carbonate may be mixed together in a volume ratio of about 1:1 to about 1:9, and the electrolyte solution may have enhanced performance. The organic solvent may be prepared by further adding an aromatic hydrocarbon-based solvent to the carbonate-based solvent. In this case, the carbonate-based solvent and the aromatic hydrocarbon-based solvent are mixed together in a volume ratio of about 1:1 to about 30:1. The aromatic hydrocarbon-based organic solvent may be an aromatic hydrocarbon-based compound represented by the following Chemical Formula 2.

[Chemical Formula 2]

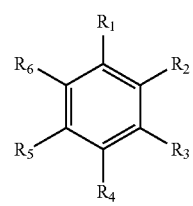

In Chemical Formula 2, $R_1$ to $R_6$ are the same as or different from each other, and are selected from a group including hydrogen, a halogen, a C1-C10 alkyl group, a haloalkyl group, or a combination thereof. The aromatic hydrocarbon-based organic solvent may be selected from the group consisting of benzene, fluorobenzene, 1,2-difluorobenzene, 1,3-difluorobenzene, 1,4-difluorobenzene, 1,2,3- trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, and a combination thereof.

The electrolyte may further contain vinylene carbonate or an ethylene carbonate-based compound of Chemical Formula 3 below as a lifespan improvement additive in order to improve the battery lifespan.

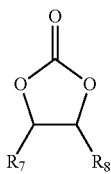

[Chemical Formula 3]

In Chemical Formula 3, $R_7$ and $R_8$ are the same as or different from each other, and are selected from a group including hydrogen, a halogen group, a cyano group (CN), a nitro group ($NO_2$), or a C1-C5 fluoroalkyl group, and at least one of $R_7$ and $R_8$ is selected from a group including a halogen group, a cyano group (CN), a nitro group ($NO_2$), or a C1-C5 fluoroalkyl group, however $R_7$ and $R_8$ are not both hydrogen. Representative examples of the ethylene carbonate-based compound may include difluoroethylene carbonate, chloroethylene carbonate, dichloroethylene carbonate, bromoethylene carbonate, dibromoethylene carbonate, nitroethylene carbonate, cyanoethylene carbonate, fluoroethylene carbonate, and the like. When these lifespan improving additives are further used, the use amounts thereof may be appropriately controlled.

The lithium salt may be dissolved in the organic solvent to act as a lithium ion supply source in the battery, thereby enabling a basic operation of a lithium secondary battery and promoting the movement of lithium ions between a positive electrode and a negative electrode. Representative examples of the lithium salt include, as a supporting electrolyte salt, at least one selected from the group consisting of $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2, C_yF_{2y+1}SO_2$, where x and y are natural numbers), LiCl, LiI, and $LiB(C_2O_4)_2$ (lithium bis (oxalato) borate: LiBOB). The concentration of the lithium salt may be in a range of 0.1 to 2.0 M. If the concentration of the lithium salt falls within the above range, the electrolyte may have appropriate electrical conductivity and viscosity, such that the electrolyte performance may be excellent and the lithium ions may be effectively moved.

Depending on the type of the rechargeable lithium battery, a separator may be present between the positive electrode and the negative electrode. The separator may function to pass lithium ions. The separator may be made of polyethylene, polypropylene, polyvinylidene fluoride, or a multilayer of two or more thereof. For example, the separator may be a mixed multilayer separator such as a polyethylene/polypropylene two-layer separator, a polyethylene/polypropylene/polyethylene three-layer separator, or a polypropylene/polyethylene/polypropylene three-layer separator.

The rechargeable lithium battery may be classified as a lithium ion battery, a lithium ion polymer battery, and a lithium polymer battery according to the type of the separator and the electrolyte used in the battery. The rechargeable lithium battery may also be classified into one having a cylindrical shape, a square shape, a coin shape, a pouch shape, or the like according to a shape, and into a bulk type and a thin film type according to a size.

FIG. 1 illustrates a representative structure of a rechargeable lithium battery according to an exemplary embodiment. As shown in FIG. 1, the rechargeable lithium battery 1 may include a battery case 5 including a positive electrode 2, a negative electrode 4, and an electrolyte solution impregnated in a separator 3 interposed between the positive electrode 2 and the negative electrode 4, and a sealing member 6 sealing the battery case 5.

The following Examples (Exemplary Embodiments) and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Exemplary Embodiment 1

$Li_2CO_3$, $CO_3O_4$, and MgO are mixed to manufacture $LiCoO_2$ doped with Mg at 0.001 mol % relative to cobalt. In this case, the ratio of Li and the sum of Co and Mg is maintained at 1:1 to not generate residual Li in the surface of $LiMg_xCo_{1-x}O_2$.

Next, 1.37 g of Ti-butoxide (per 50 g of $LiCoO_2$) is dissolved in ethanol to manufacture a sol-gel solution, which is stirred with the $LiCoO_2$, doped with Mg ($LiMg_xCo_{1-x}O_2$).

The stirred mixture is sufficiently dried for more than 24 hours, and heat treatment is performed for 3 hours by increasing the temperature to 950° C. at a rate of 5° C./min and the positive active material is manufactured as a final product through natural cooling.

In this case, the manufactured positive active material includes the oxide of the layered structure represented by $LiMg_{(0.001-x)}Co_{(0.999+x)}O_2$ (0<x≤0.001) and the coating layer represented by $Mg_yTiO_3$ (0<y≤1) formed in the oxide surface.

Exemplary Embodiment 2

The positive active material is manufactured by the same method as Exemplary Embodiment 1, except for manufacturing and using $LiCoO_2$ doped with Mg at 0.002 mol %.

In this case, the manufactured positive active material includes the oxide of the layered structure represented by $LiMg_{(0.002-x)}Co_{(0.998+x)}O_2$ (0<x≤0.001) and the coating layer represented by $Mg_yTiO_3$ (0<y≤1) formed in the oxide surface.

Exemplary Embodiment 3

The positive active material is manufactured by the same method as Exemplary Embodiment 1, except for manufacturing and using $LiCoO_2$ doped with Mg at 0.005 mol %.

In this case, the manufactured positive active material includes the oxide of the layered structure represented by LiMg$_{(0.005-x)}$Co$_{(0.995+x)}$O$_2$ (0<x≤0.002) and the coating layer represented by Mg$_y$TiO$_3$ (1<y≤2) formed in the oxide surface.

Exemplary Embodiment 4

The positive active material is manufactured by the same method as Exemplary Embodiment 1, except for manufacturing and using LiCoO$_2$ doped with Mg at 0.01 mol %.

In this case, the manufactured positive active material includes the oxide of the layered structure represented by LiMg$_{(0.01-x)}$Co$_{(0.99+x)}$O$_2$ (0<x≤0.002) and the coating layer represented by Mg$_2$TiO$_4$ formed in the oxide surface.

Exemplary Embodiment 5

The positive active material is manufactured by the same method as Exemplary Embodiment 1, except for manufacturing and using LiCoO$_2$ doped with Mg at 0.02 mol %. In this case, the manufactured positive active material includes the oxide of the layered structure represented by LiMg$_{(0.02-x)}$Co$_{(0.98+x)}$O$_2$ (0<x≤0.002) and the coating layer represented by Mg$_2$TiO$_4$ formed in the oxide surface.

Comparative Example 1

The positive active material is manufactured by the same method as Exemplary Embodiment 1, except for manufacturing and using LiCoO$_2$ that is doped with Mg by mixing Li$_2$CO$_3$ and Co$_3$O$_4$. In this case, the manufactured positive active material includes the oxide of the layered structure represented by LiCoO$_2$ and the coating layer represented by TiO$_2$ formed in the oxide surface.

Comparative Example 2

LiCoO$_2$ is manufactured doped with Mg at 0.01 mol % by mixing Li$_2$CO$_3$, Co$_3$O$_4$, and MgO. The mixture is sufficiently dried for more than 24 hours, and the heat treatment is performed for 3 hour by increasing the temperature to 950° C. at a rate of 5° C./min and the positive active material is manufactured as a final product through natural cooling. In this case, the manufactured positive active material includes the oxide of the layered structure represented by LiMg$_{0.01}$CO$_{0.99}$O$_2$ and the coating layer is not formed.

Exemplary Embodiment 6 to Exemplary Embodiment 8—Manufacturing the Rechargeable Lithium Battery The rechargeable lithium batteries according Exemplary Embodiment 6 to Exemplary Embodiment 8 are respectively manufactured by using the positive active materials respectively manufactured in Exemplary Embodiment 3 to Exemplary Embodiment 5. The positive active material at 92 wt %, polyvinylidene fluoride (PVDF) at 4 wt %, and acetylene black at 4 wt % are mixed, and then dispersed in N-methyl-2-pyrrolidone to manufacture a slurry. Next, the slurry is coated on an aluminum foil, dried, and rolled to manufacture the positive electrode. A half battery of a coin type is manufactured by using lithium metal as a counter electrode of the positive electrode. In this case, an electrolyte solution in which 1.15M LiPF$_6$ is dissolved in a solvent of ethylene carbonate (EC), ethyl methyl carbonate (EMC), and dimethyl carbonate (DMC) (EC:EMC:DMC=2:4:4 volume ratio) is used.

Comparative Example 3 and Comparative Example 4

The rechargeable lithium batteries according to Comparative Example 3 and Comparative Example 4 are manufactured by the same method as Exemplary Embodiment 6 by using the positive active materials respectively manufactured in Comparative Example 1 and Comparative Example 2.

Experimental Example 1: Confirmation of the Continuously Reduced Concentration Gradient of the Dopant SEM images of the positive active material manufactured according to Exemplary Embodiments 1 to 5 and Comparative Example 1 are illustrated in FIG. 2A to FIG. 2F. In the case of Comparative Example 2, the first oxide particle is not coated to form the surface coating layer. Accordingly, measurement of a coating layer is not separately performed. Referring to FIG. 2A to FIG. 2E, in the case of the positive active materials according to Exemplary Embodiments 1 to 5 manufactured by the method of forming the second oxide layer in the surface of the first oxide particle through the heat treatment after coating the doped first oxide particle, it may be confirmed that the concentration gradient of Mg is gradually reduced from the surface of the positive active material toward the inside. However, referring to FIG. 2F, in the case of the positive active material manufactured according to Comparative Example 1, it may be confirmed that Ti is only observed in the surface and the concentration gradient of Mg is not seen.

Figure 3A:
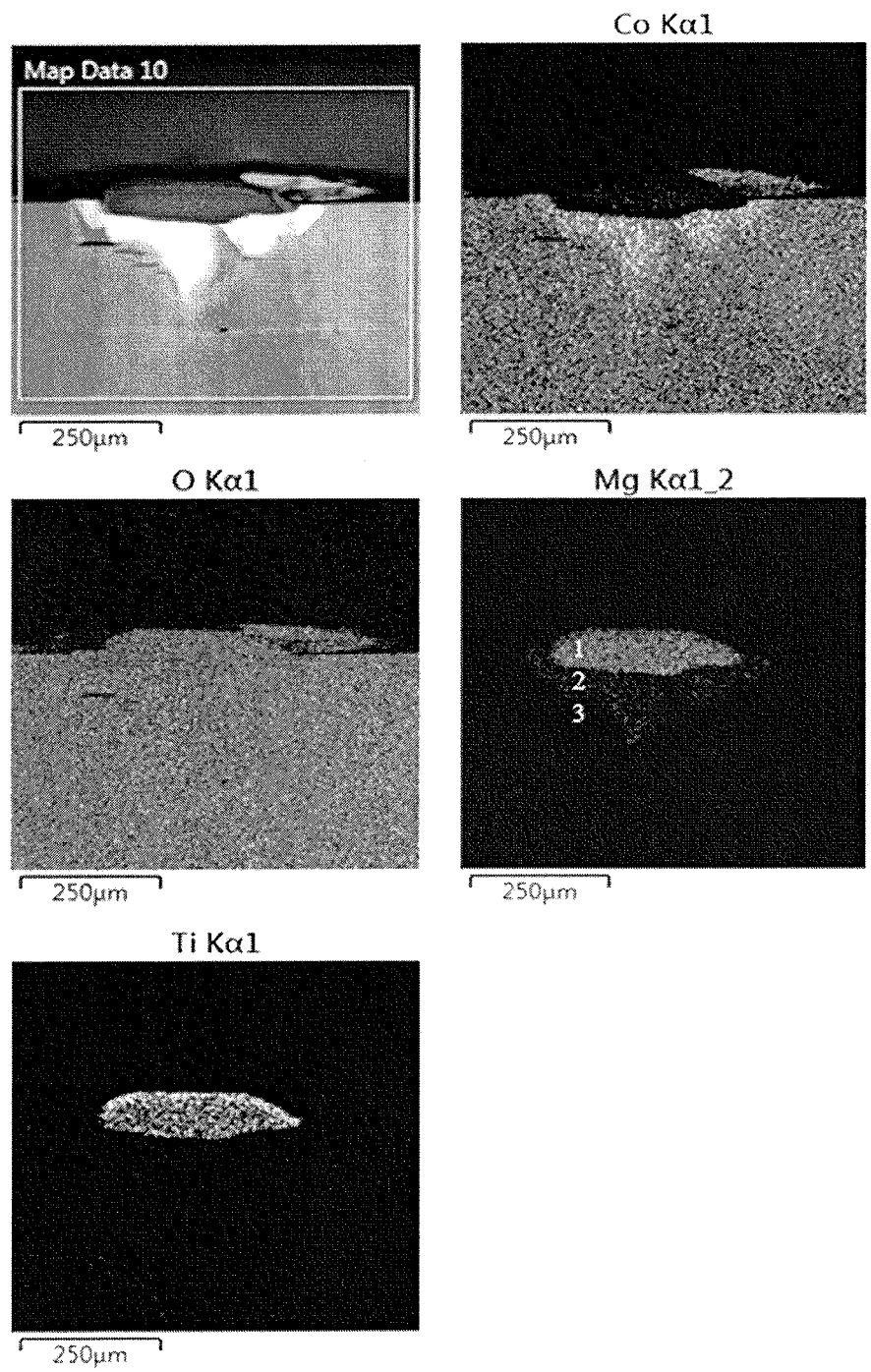
FIG. 3A and FIG. 3B illustrate TEM images of a positive active material manufactured by Exemplary Embodiment 4 and Comparative Example 1, respectively.
Figure 3B:
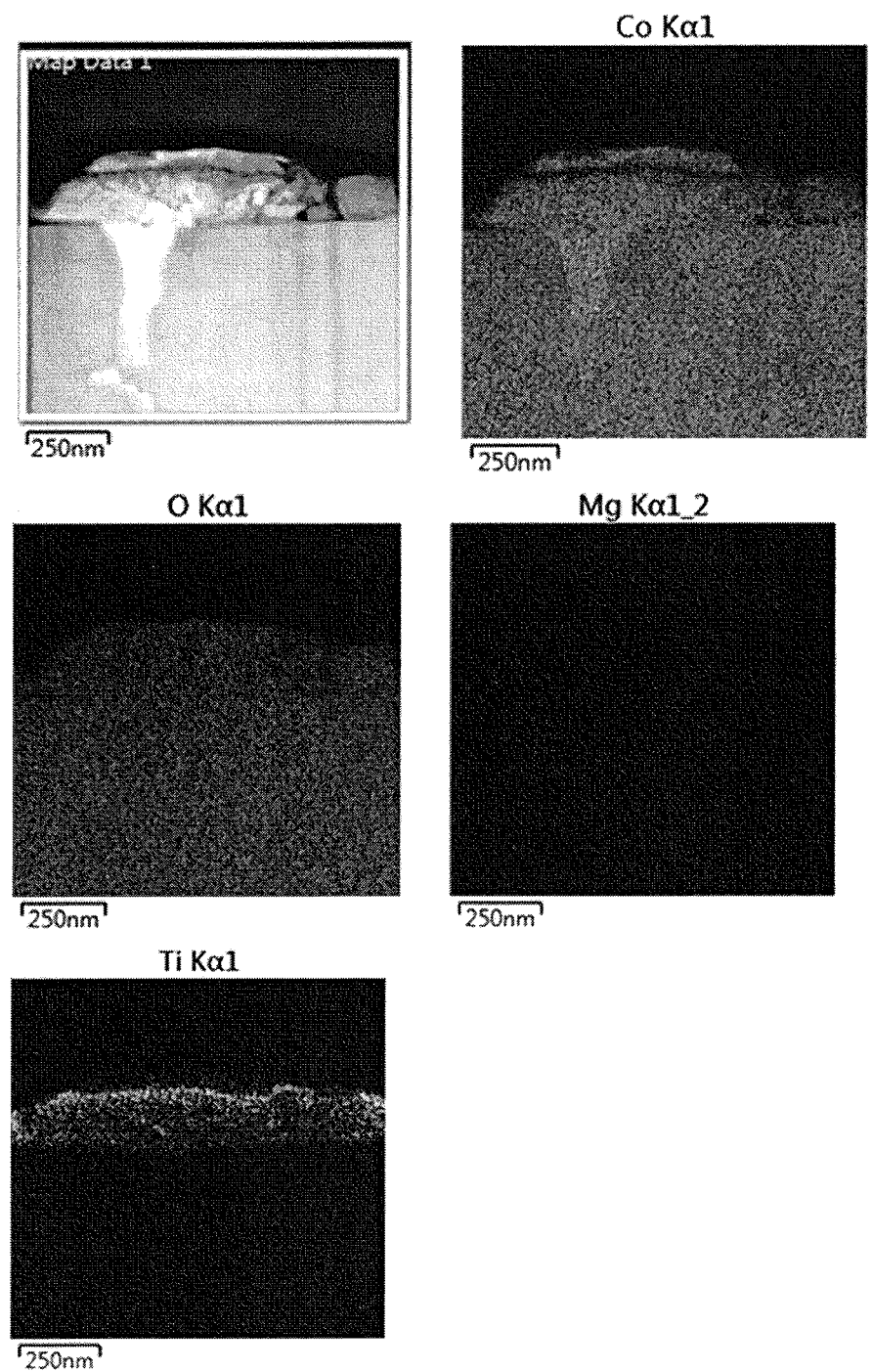

FIG. 3A and FIG. 3B respectively illustrate TEM images of the positive active material according to Exemplary Embodiment 4 and Exemplary Embodiment 1.

Referring to FIG. 3A, to describe the distribution of Mg from the surface coating layer in the positive active material manufactured according to Exemplary Embodiment 4, it may be confirmed that the concentration gradient is decreased from the surface of the active material toward the inside, that is, in the 1, 2, 3 direction. However, referring to FIG. 3B, in the positive active material according to Comparative Example 1 manufactured by the method of coating the first oxide particle without the doping, only the concentration gradient of Co and Ti may be confirmed, and the concentration gradient of Mg is not seen.

Experimental Example 2: Mg Diffusion Phenomena Observation

For the positive active materials manufactured according to Exemplary Embodiments 2 to 4 and Comparative Example 2, results of analyzing element distributions for Co, Mg, and Ti of the coating layer by using electron probe micro-analysis (EPMA) equipment are illustrated in FIG. 4A to FIG. 4D.

Figure 4A:
FIG. 4A to FIG. 4D illustrate images showing surface analysis results of a dopant in a positive active material manufactured by Exemplary Embodiment 3 to Exemplary Embodiment 4 and Comparative Example 2, respectively.
Figure 4A:
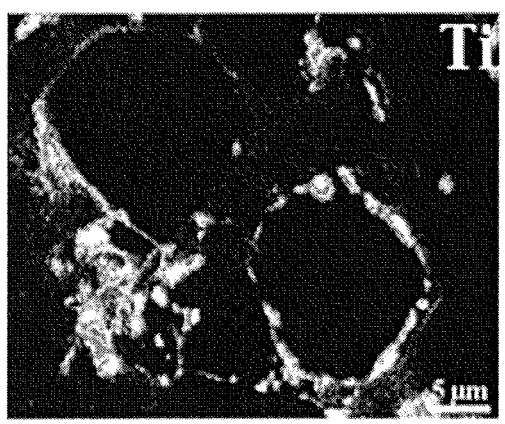
Figure 4A:
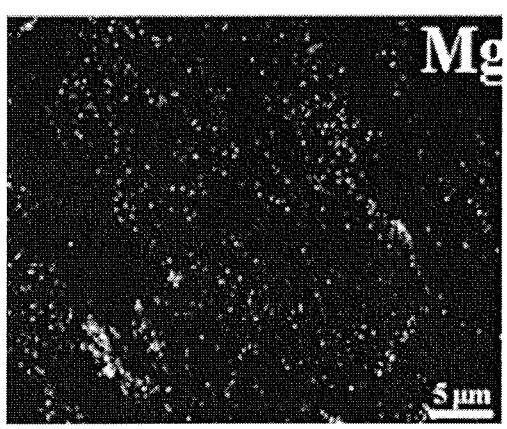
Figure 4B:
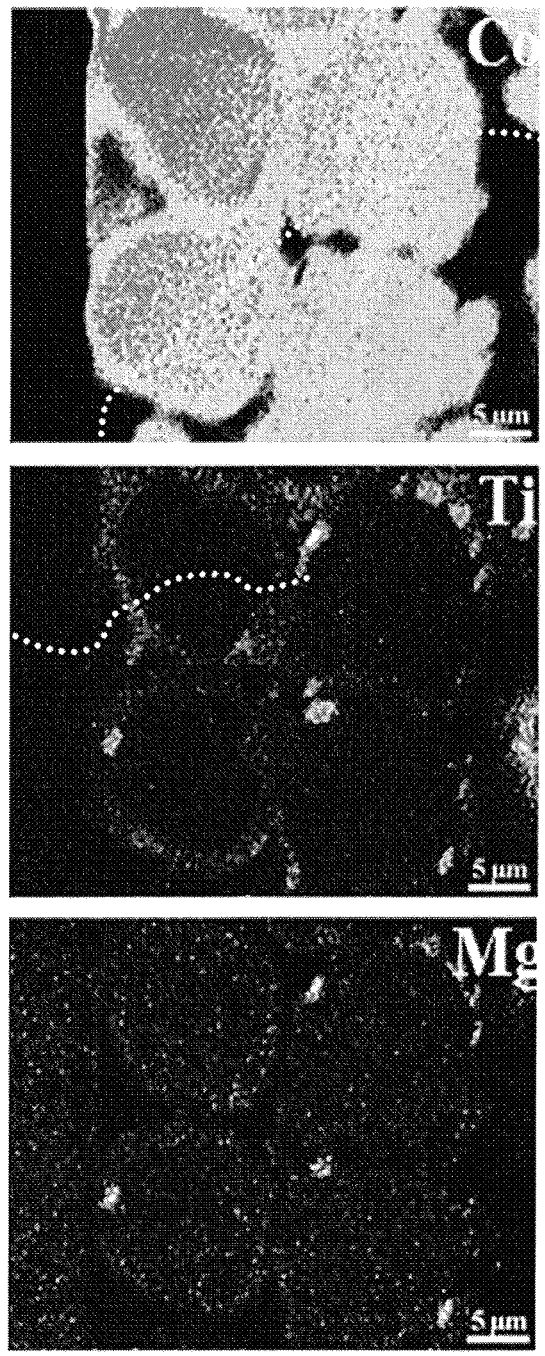
Figure 4C:
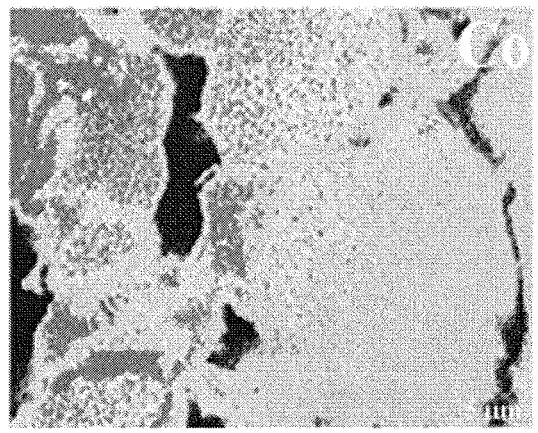
Figure 4C:
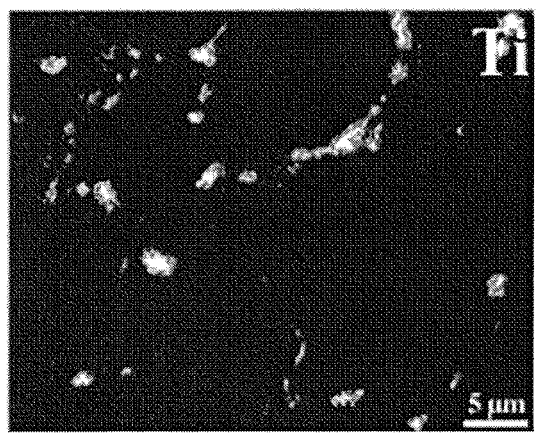
Figure 4C:
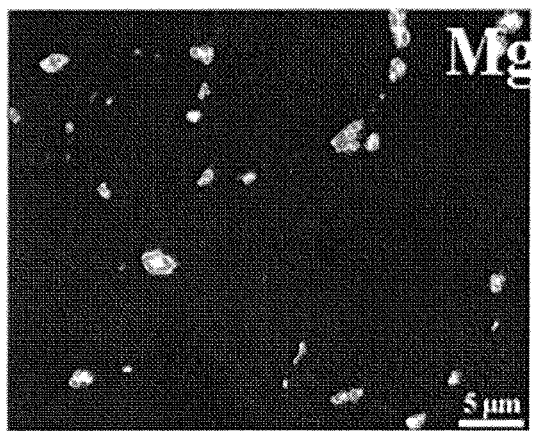
Figure 4D:
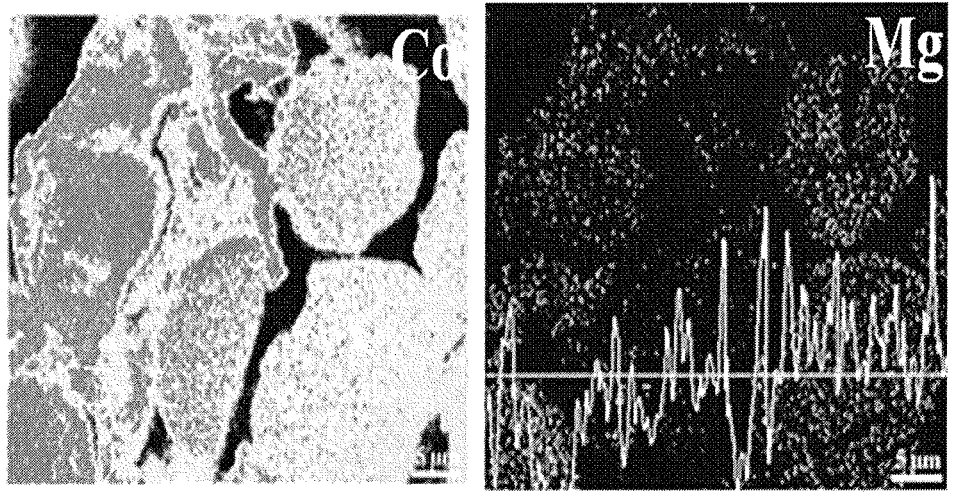

As illustrated in FIG. 4A to FIG. 4C, in the positive active material according to Exemplary Embodiments 2 to 4 in which the doped first oxide particle is coated and then heat-treated, it may be confirmed that Mg exists in the coating layer. In contrast, as shown in FIG. 4D, in the case of the positive active material according to Comparative Example 2, in which the heat treatment is performed without the coating of the doped first oxide particle, it may be confirmed that Mg is distributed on the entire region of the LiCoO$_2$ active material. For example, when comparing FIG. 4C and FIG. 4D with respect to Exemplary Embodiment 4 and Comparative Example 2 in which the first oxide particle is doped with the same concentration, a difference may be clearly seen in the surface diffusion of Mg depending on the coating existence even in positive active materials having the same doping concentration. Also, referring to FIG. 4D, when the coating is omitted, Mg is distributed throughout the entire active material. However, it may be confirmed that the distribution of Mg is diffused to the position of Ti that is distributed in the active material surface when the doping amount of Mg is increased. Accordingly, it can be determined that when Ti is not coated on the surface of the active material, Mg is uniformly distributed inside the active material, but when Ti is coated on the surface of the active material, Mg is diffused toward the surface of the active material.

Experimental Example 3: Second Oxide Layer Observation

Surface characteristics of the positive active materials according to Exemplary Embodiment 4 and Comparative Example 1 are measured to be confirmed by using a scanning transmission electron microscope, and are illustrated in FIG. 5A to FIG. 5C and FIG. 6A to FIG. 6C, respectively.

Figure 5A:
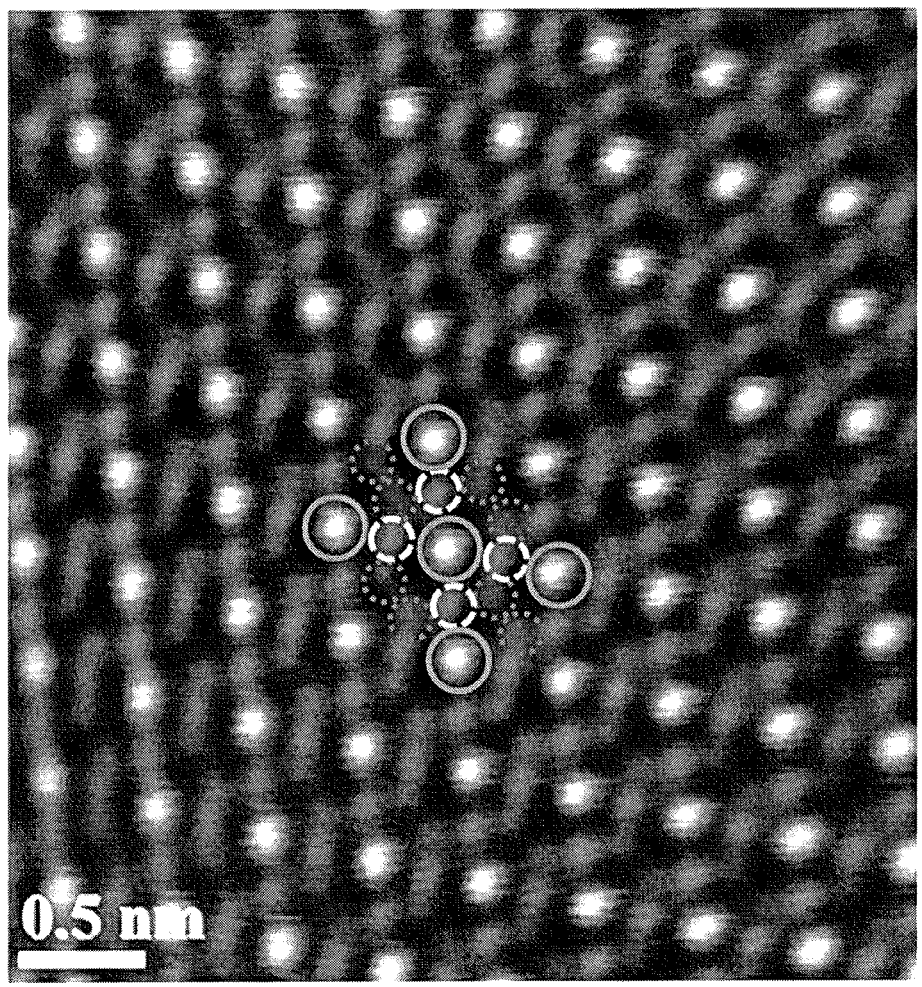
FIG. 5A and FIG. 5B illustrate views to explain a surface characteristic of a positive active material manufactured according to Exemplary Embodiment 4.
Figure 5B:
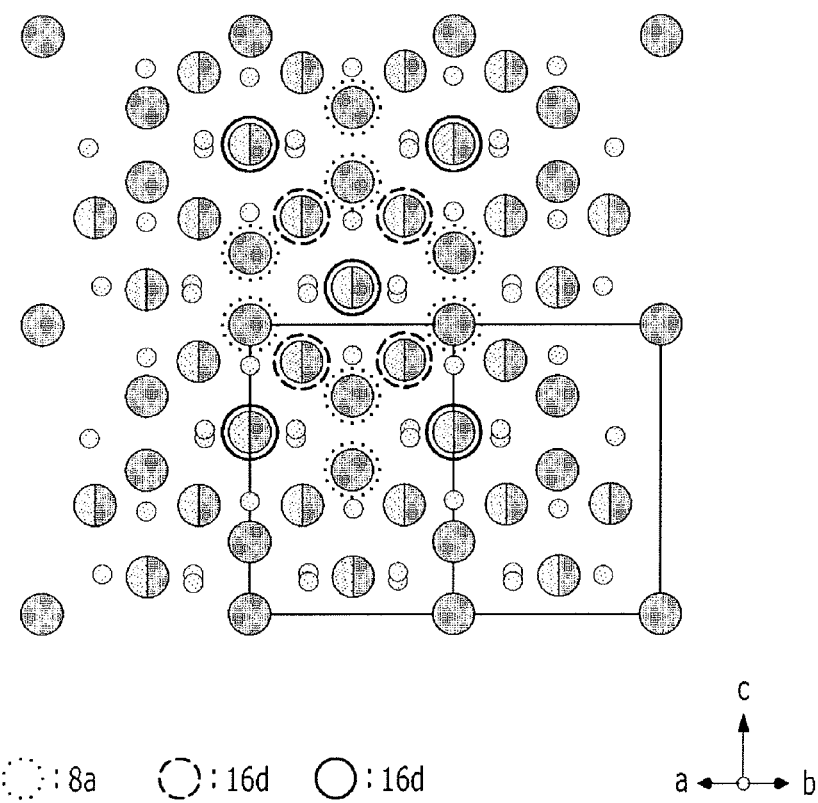
Figure 6A:
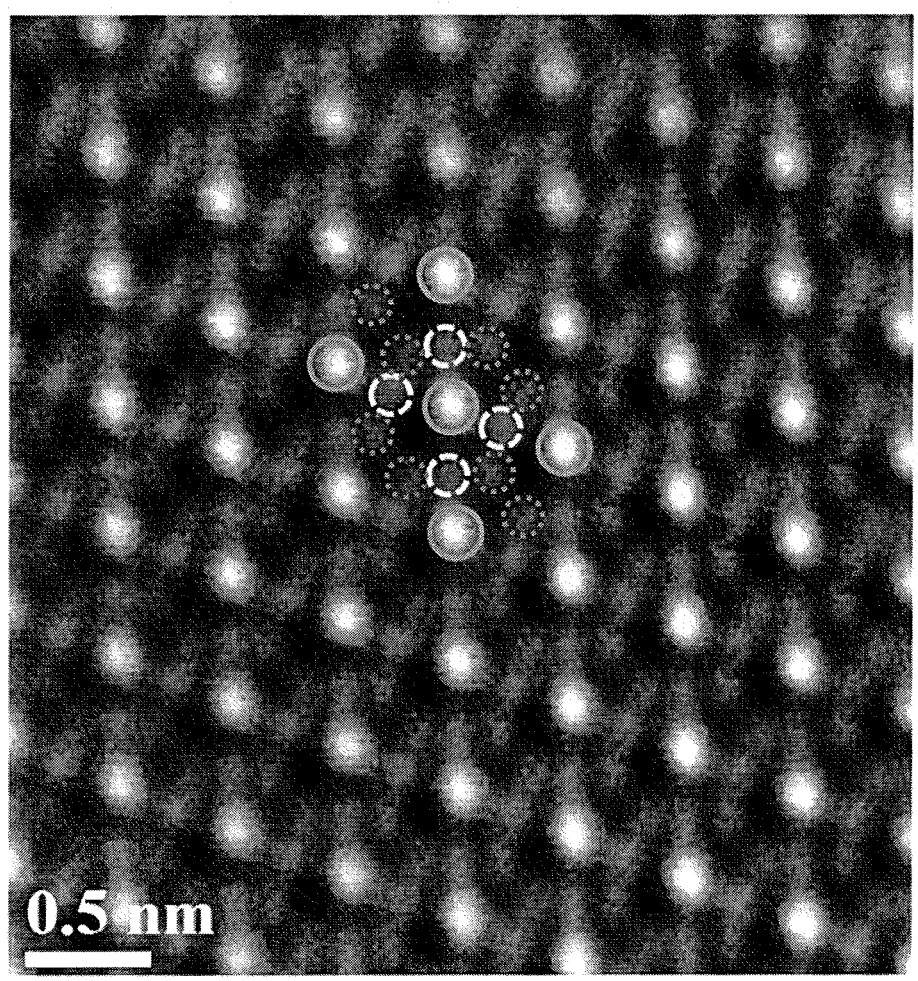
FIG. 6A and FIG. 6B illustrate views to explain a surface characteristic of a positive active material manufactured according to Comparative Example 1.
Figure 6B:
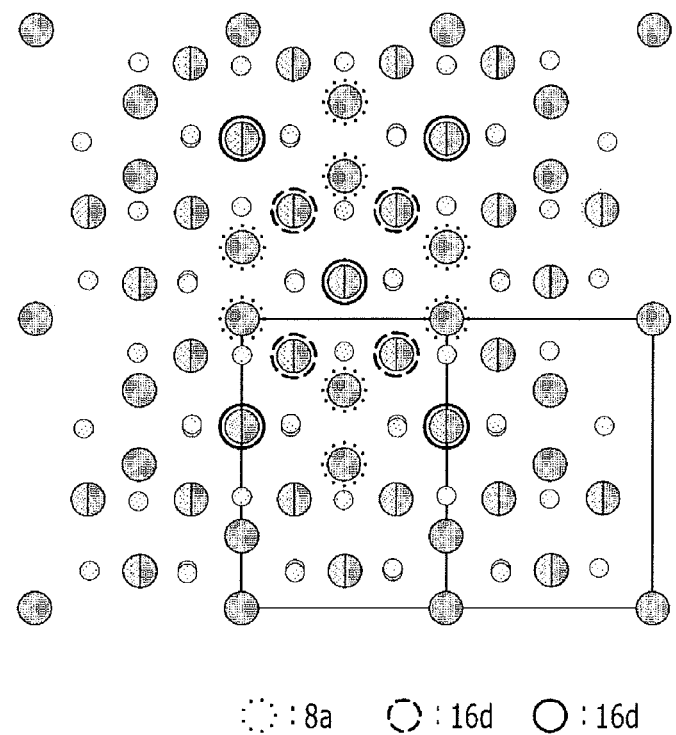

FIG. 5A and FIG. 6A illustrate scanning transmission electron microscope images of the positive active material surface manufactured according to Exemplary Embodiment 4 and Comparative Example 1, respectively, and FIG. 5B and FIG. 6B illustrate an atomic model for a part of FIG. 5A and FIG. 6A, respectively.

Referring to FIG. 5A, it may be confirmed that the coating layer of the positive active material according to Exemplary Embodiment 4 is formed of the spinel structure of Mg$_2$TiO$_4$, and as shown in the atomic model of FIG. 5B, it may be confirmed that Mg is positioned at the 8a site, and Ti or Mg is positioned at the 16d site. This result indicates that a crystallographic structure appears in a plane (110) of the Mg$_2$TiO$_4$ structure.

Referring to FIG. 6A and FIG. 6B, it may be confirmed that the coating layer of the positive active material according to Comparative Example 1 is formed of the spinel structure of Co$_2$TiO$_4$.

Experimental Example 4: Rate Characteristic

Figure 7:
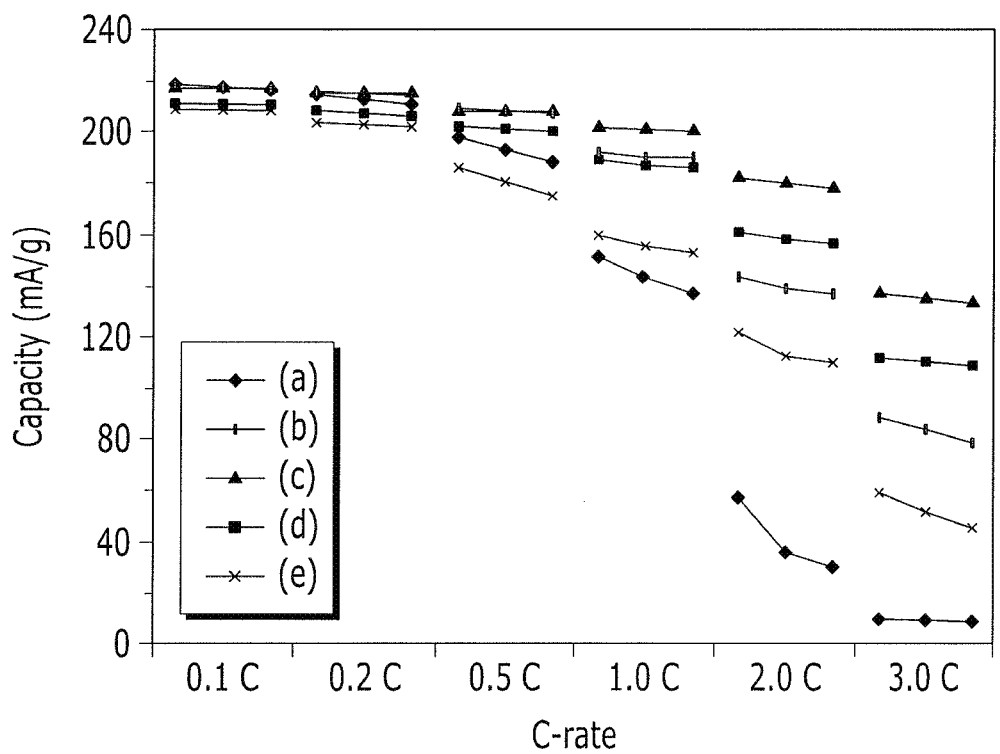
FIG. 7 illustrates a view showing a rate characteristic of a positive active material manufactured according to Exemplary Embodiments 6 to 8 and Comparative Examples 3 and 4.

For the rechargeable lithium battery manufactured according to Exemplary Embodiment 6 to Exemplary Embodiment 8 and Comparative Examples 3 and 4, charge and discharge are performed at a voltage of 3.0 V to 4.55 V with a condition of 0.1 C, 0.2 C, 0.5 C, 1.0 C, 2.0 C, and 3.0 C to estimate the rate characteristic, and results thereof are shown in FIG. 7. Referring to FIG. 7, in the case of the rechargeable lithium battery according to Exemplary Embodiment 6 to Exemplary Embodiment 8 manufactured by using the positive active material in which the second oxide layer is formed through the heat treatment after coating the surface of the doped first oxide particle, it can be confirmed that the rate characteristic is remarkably improved compared with the rechargeable lithium battery according to Comparative Example 3 and Comparative Example 4 manufactured by using the positive active material formed through only doping or only coating. Accordingly, it may be confirmed that forming the second oxide layer in the surface of the first oxide particle may play an important role to ensure the rate characteristic.

Experimental Example 5: Lifespan Characteristic

For the rechargeable lithium battery manufactured according to Exemplary Embodiment 6 to Exemplary Embodiment 8 and Comparative Examples 3 and 4, the lifespan characteristic is estimated through a 50 cycle charge and discharge at a charge voltage of 3.0 V to 4.55 V and a condition of 0.5 C. Results thereof are shown in Table 1 and FIG. 8.

TABLE 1

|  | Lifespan persistence rate (unit: %) after 50 cycles for initial lifespan |
| --- | --- |
| Exemplary Embodiment 6 | 61.35 |
| Exemplary Embodiment 7 | 82.79 |
| Exemplary Embodiment 8 | 72.99 |
| Comparative Example 3 | 30.45 |
| Comparative Example 4 | 55.19 |

Figure 8:
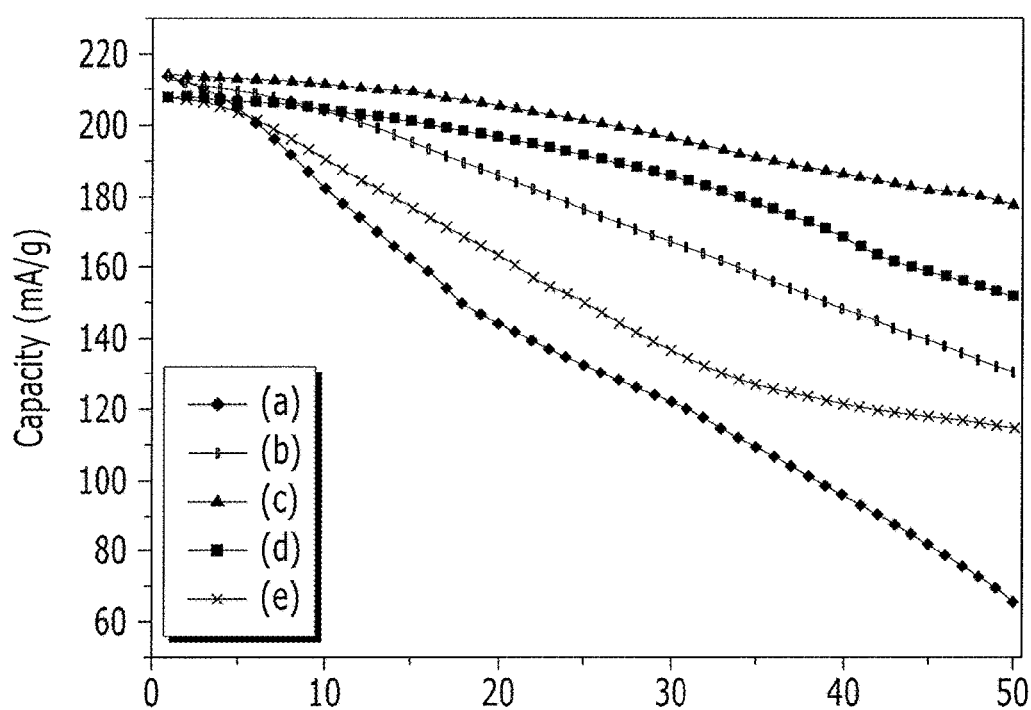
FIG. 8 illustrates a view showing a rate characteristic of a positive active material manufactured according to Exemplary Embodiments 6 to 8 and Comparative Examples 3 and 4.

Referring to Table 1 and FIG. 8, in the case of the rechargeable lithium battery according to Exemplary Embodiment 6 to Exemplary Embodiment 8 manufactured by using the positive active material in which the second oxide layer is formed through the heat treatment after coating the surface of the doped first oxide particle, it may be confirmed that the lifespan characteristic is excellent compared with the rechargeable lithium battery according to Comparative Examples 3 and 4 manufactured by using the positive active material formed through only doping or only coating. Particularly, compared with general art in which the lifespan characteristic is deteriorated if the doping amount of Mg is increased, it may be confirmed in the case of the exemplary embodiments that the further excellent lifespan characteristic appears as the doping amount of Mg is increased.

Experimental Example 6: Phase Transition Characteristic

Figure 9A:
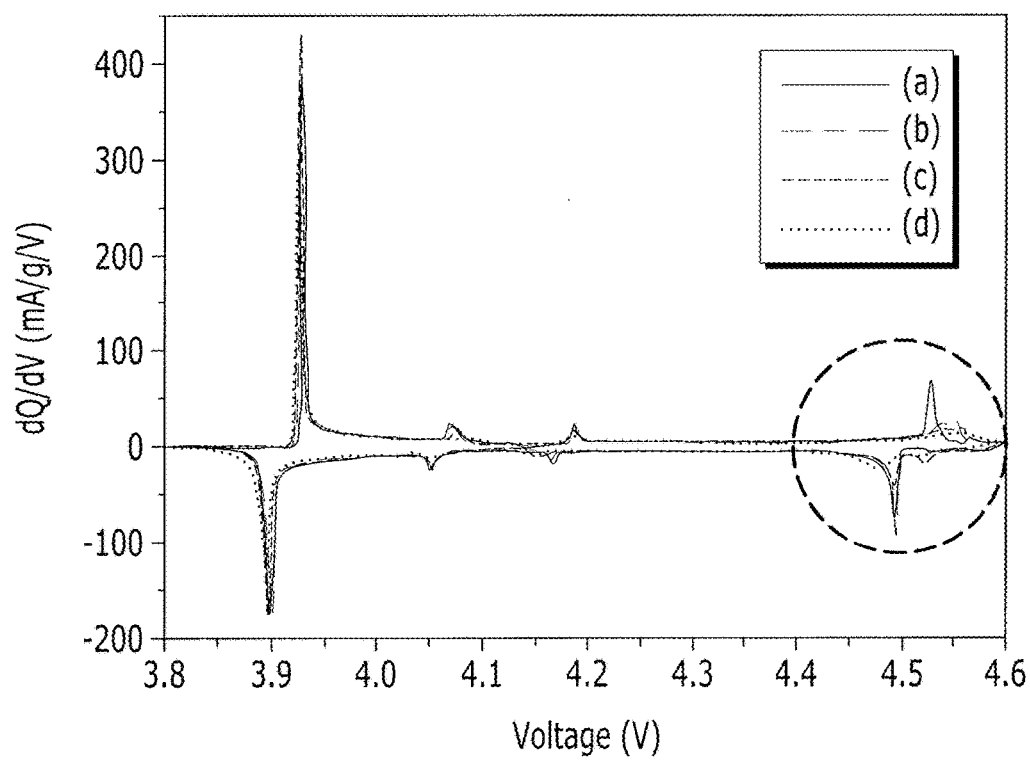
FIG. 9A illustrates a view showing a phase transition characteristic of a positive active material manufactured according to Exemplary Embodiments 6 to 8 and Comparative Example 3.
Figure 9B:
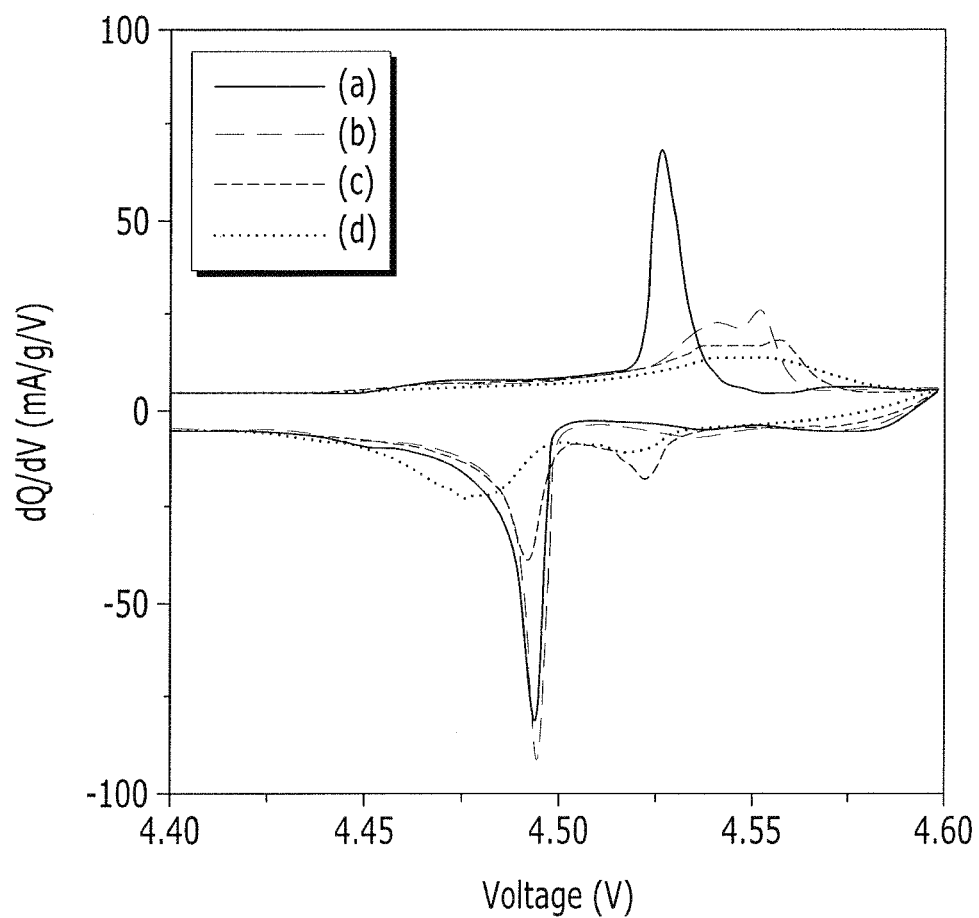
FIG. 9B illustrates a partially enlarged view of FIG. 9A.

For the rechargeable lithium battery manufactured according to Exemplary Embodiment 6 to Exemplary Embodiment 8 and Comparative Example 3, a phase transition characteristic is measured at 3.0 V to 4.55 V, and a result thereof is shown in FIG. 9A, and for better comprehension and ease of description, an enlarged view of the circled part of FIG. 9A is shown in FIG. 9B. Referring to FIG. 9B, in the case of the rechargeable lithium battery according to Exemplary Embodiment 6 to Exemplary Embodiment 8, it may be confirmed that the phase transition occurs when reaching a high voltage of more than 4.55 V. Accordingly, it may be confirmed that the rechargeable lithium battery using the positive active material according to the present disclosure may be conveniently utilized also when the high-voltage charging is required.

By way of summation and review, in a commercially available positive active material, a metal oxide is generally coated on a surface of the positive active material to prevent a side reaction with an electrolyte solution. However, generally, for the coating, a coating composition is manufactured separately from a manufacturing process or the coating process is generally executed after firstly manufacturing the coating composition. In this case, it is difficult to simplify the manufacturing process. Accordingly, the inventors of the present disclosure extensively researched ways that the lifespan and rate characteristics of the positive active material for the rechargeable lithium battery could be improved without separation of the manufacturing processes. As a result, it was discovered that when manufacturing the positive active material by a method of coating a first oxide particle of a layered structure doped with a predetermined dopant by a catalyst including a metal oxide of a single element and heat-treating the first oxide particle, the above-described objects were obtained and the present disclosure was completed.

In addition, embodiments provide a positive active material for a rechargeable lithium battery having improved cycle-life and rate characteristics by improving electrical conductivity. Embodiments further provide a rechargeable lithium battery including the positive active material. Further, according to the manufacturing method of the positive active material of the rechargeable lithium battery according to an exemplary embodiment, excellent productivity may be obtained through process simplification.

Example embodiments have been disclosed herein, and although specific terms are employed, they are used and are to be interpreted in a generic and descriptive sense only and not for purpose of limitation.

What is claimed is:

1. A positive active material for a rechargeable lithium battery, the positive active material comprising:
a first oxide particle having a layered structure; and
a second oxide layer located on a surface of the first oxide particle and including a second oxide represented by Chemical Formula 1 below:

$M_aL_bO_c$, [Chemical Formula 1]

wherein in Chemical Formula 1,
$0<a\leq3$,
$1\leq b\leq2$,
$3.8\leq c\leq4.2$,
M is at least one element selected from the group of Mg, Al, Ga, and combinations thereof, and
L is at least one element selected from of group Ti, Zr, and combinations thereof, and
wherein:
a concentration of the M in the second oxide decreases according to a continuous concentration gradient from a surface of the positive active material toward an inside of the positive active material,
the second oxide has a spinel structure,
the second oxide includes a phase of $Mg_2TiO_4$, and
the first oxide is at least one selected from a lithium nickel-based oxide, lithium cobalt-based oxide, lithium iron phosphate-based oxide, lithium manganese-based oxide, lithium titanium-based oxide, lithium nickel manganese-based oxide, lithium nickel cobalt manganese-based oxide, lithium nickel cobalt aluminum-based oxide, and combinations thereof.

2. A rechargeable lithium battery, comprising:
a positive electrode including the positive active material as claimed in claim 1;
a negative electrode including a negative active material; and
an electrolyte.

* * * * *